(No Model.)   3 Sheets—Sheet 1.
F. STEINMANN.
MACHINE FOR MAKING HOOKS FOR STRETCHING CURTAINS.
No. 517,775.   Patented Apr. 3, 1894.
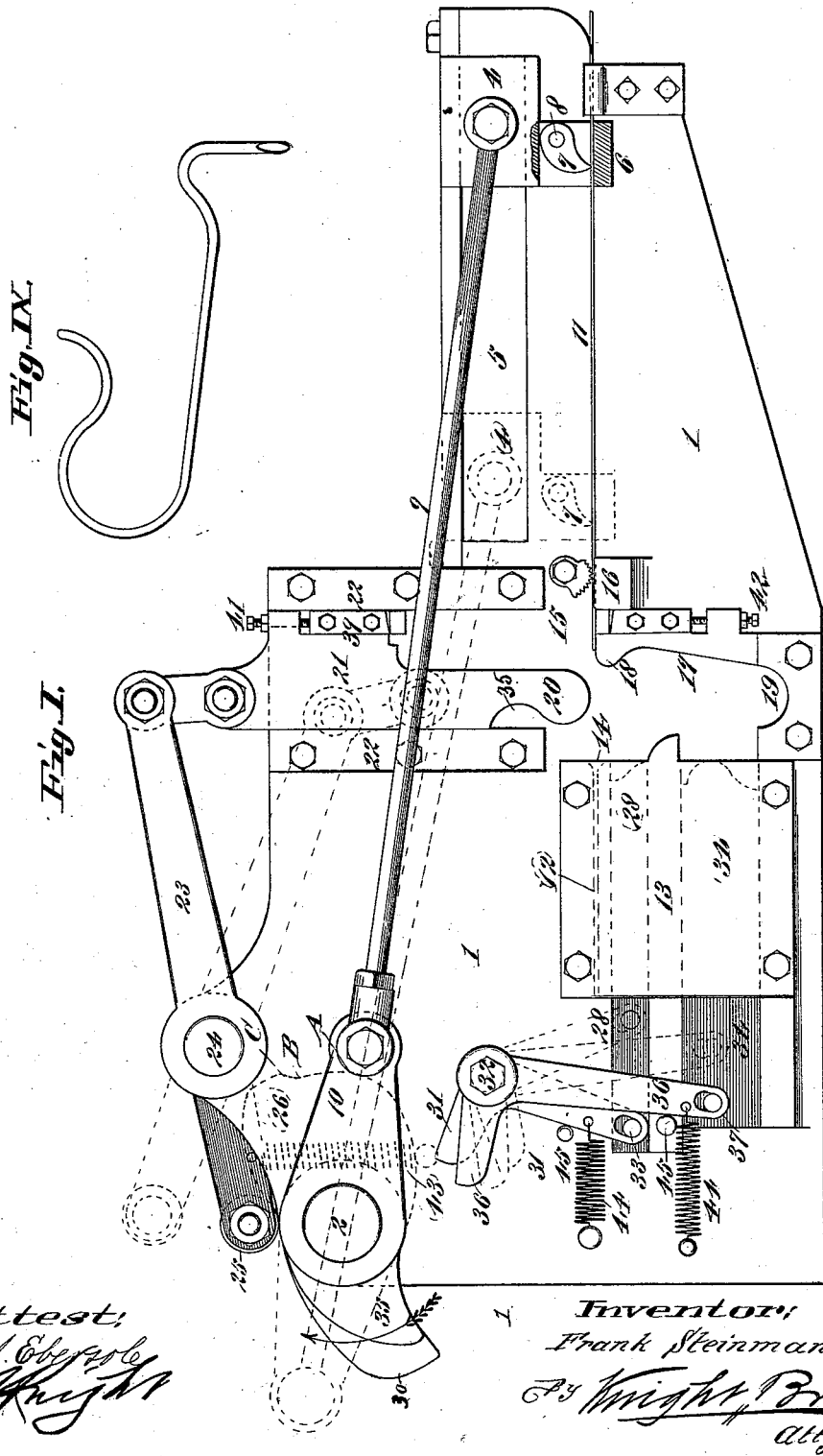
Attest:
A. W. Ebersole
E. Knight
Inventor:
Frank Steinmann,
By Wright Bro
Attys (No Model.) 3 Sheets—Sheet 2.
F. STEINMANN.
MACHINE FOR MAKING HOOKS FOR STRETCHING CURTAINS.
No. 517,775. Patented Apr. 3, 1894.
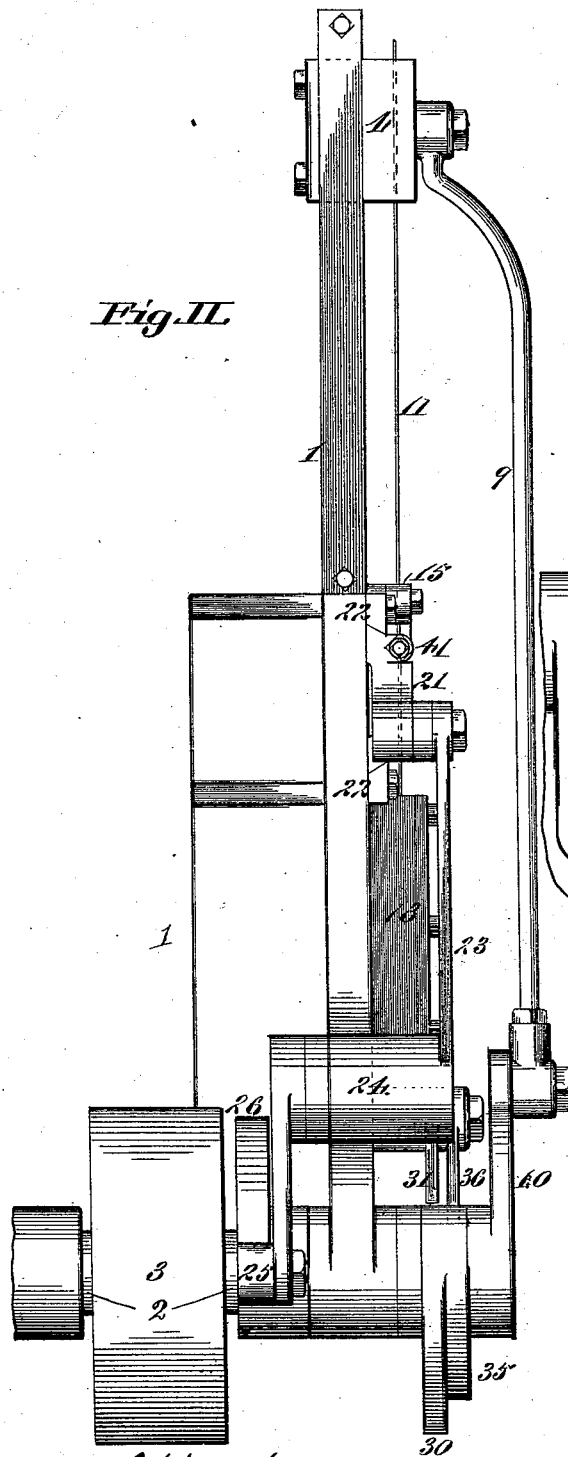
Fig. II.
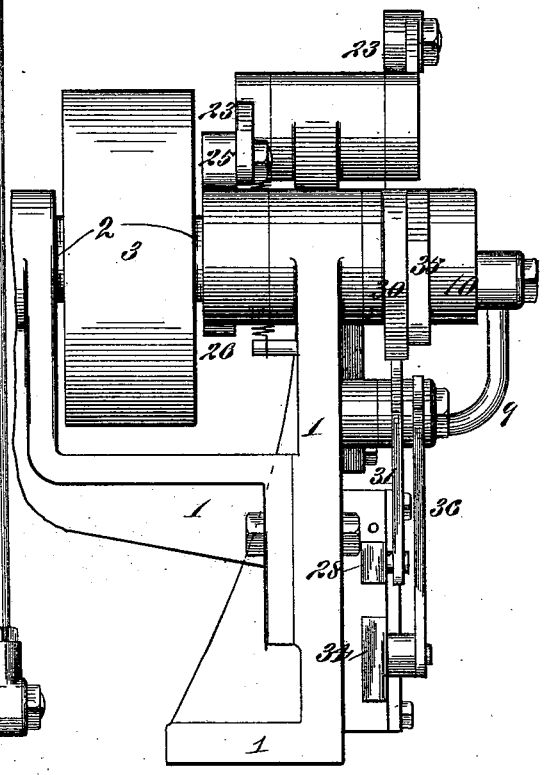
Fig. III.
Inventor,
Frank Steinmann
Attest:

(No Model.) 3 Sheets—Sheet 3.
F. STEINMANN.
MACHINE FOR MAKING HOOKS FOR STRETCHING CURTAINS.
No. 517,775. Patented Apr. 3, 1894.
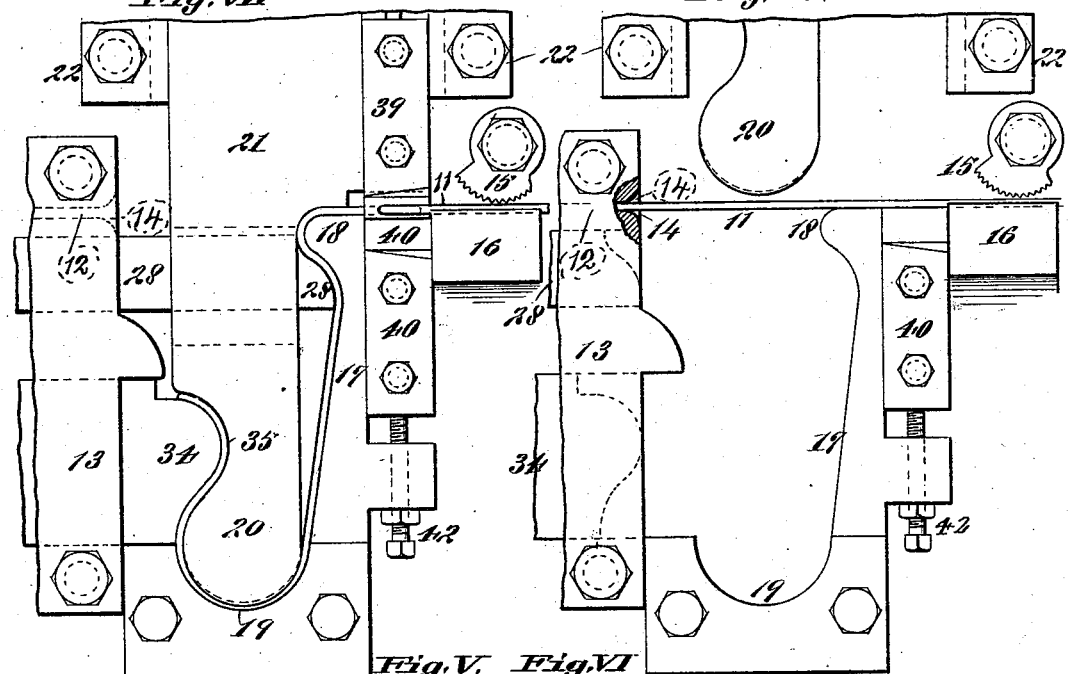
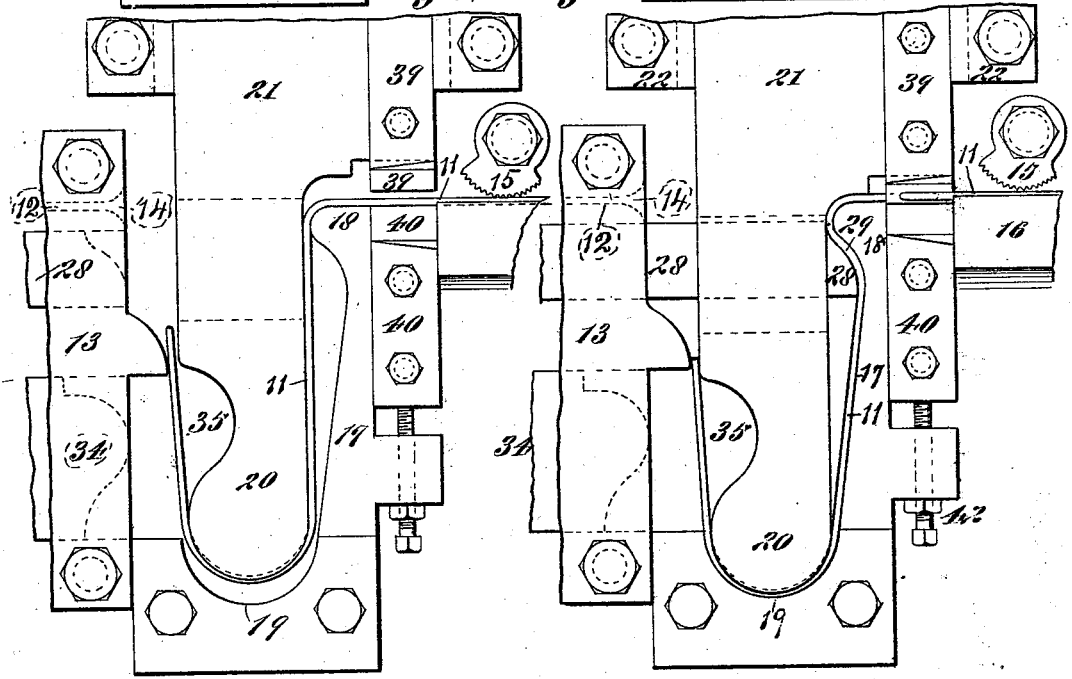
Attest:
A. W. Ebersole
C. Knight
Fig. VIII.
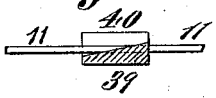
Inventor:
Frank Steinmann
By Wright Bro
attys

UNITED STATES PATENT OFFICE.

FRANK STEINMANN, OF ST. LOUIS, MISSOURI.

MACHINE FOR MAKING HOOKS FOR STRETCHING CURTAINS.

SPECIFICATION forming part of Letters Patent No. 517,775, dated April 3, 1894.

Application filed May 22, 1893. Serial No. 475,171. (No model.)

*To all whom it may concern:*

Be it known that I, FRANK STEINMANN, of the city of St. Louis, in the State of Missouri, have invented a certain new and useful Improvement in Machines for Making Hooks for Stretching Curtains, of which the following is a full, clear, and exact description, reference being had to the accompanying drawings, forming part of this specification.

My invention relates to an improved machine for making hooks for stretching curtains, and the like, and my invention consists in features of novelty hereinafter fully described and pointed out in the claims.

Figure I is a side elevation, illustrative of my invention. Fig. II is a top or plan view. Fig. III is a rear elevation. Figs. IV to VII both inclusive, represent the form and the operation of the dies. Fig. VIII is a detail view of the knives or cutters. Fig. IX is a view of one of the hooks.

Referring to the drawings, 1 represents the main plate or frame of the machine, to which is journaled the power shaft 2 having a driving pulley 3.

4 is a sliding head working in an opening 5 in the frame 1, and which has a bearing plate 6. 7 is a dog hinged to the head 4, at 8.

9 represents a link or pitman connecting the head 4 to a crank 10 on the shaft 2.

11 represents the wire from which the hooks are formed. In the operation of the machine the wire is caught between the dog 7 and the plate 6, and as the head 4 is moved forward to the position shown in dotted lines, Fig. I, the wire is moved forward and is received by an opening 12, in a stationary head 13, the opening preferably having a bell mouth 14 to receive the wire. As the head 4 recedes, the wire is kept from moving back with the head by means of a serrated cam or dog 15, pivoted to the frame 1, and which nips the wire upon a fixed projection 16 on the frame 1.

17 represents a rib projecting from the frame 1, and which has a round upper end 18, and a semi-circular bottom or lower extremity 19.

20 represents a vertically moving die secured to a sliding head 21, held by suitable slides 22. The head 21 is operated by a lever 23, pivoted at 24 to the frame 1, and having a friction roller 25, against which bears a cam 26 on the shaft 2. The cam moves in the direction of the arrow, Fig. I. When the wire has been fed forward, as described, the die 20 descends and forces the wire into the position shown in Fig. V, the inner end of the wire being withdrawn from the opening 12. During this movement of the die, the cam moves against the roller 25, to about the point indicated at A, Fig. I. The die 20 then rests while the cam is moving against the roller 25 from the point A to the point B, and during this time a die 28, held by the block or head 13, comes forward and bends the wire around the projection 18 of the rib 17, as shown at 29, Fig. VI, the die 28 being moved by a cam 30 on the shaft 2, which strikes the upper end of a bell-crank lever 31, pivoted to the frame 1, at 32, and the lower end of which is connected to the die 28, at 33, see Fig. I. The part from B to C of the cam 26 now bears against the roller 25 of the lever 23, and forces the die 20 to its lower position, seen in Fig. VI. The die 20 remains in this position for a short time, and during this time a die 34 advances and forces the wire into a recess 35 in the back of the die 20, (see Fig. VII,) and thus completes the hook. The die 34 is moved by a cam 35 on the shaft 2, which comes against the upper end of a bell crank lever 36, pivoted at 32 to the frame 1, and the lower end of which is connected at 37 to the die 34. As the die 20 completes its last movement, a knife or cutter 39 thereon, acting against a knife or cutter 40, secured to the rib 17, severs the wire, as shown in Figs. VI and VIII. The knife or cutter 39 may be adjusted by a set screw 41, as it becomes worn, and the knife or cutter 40 may be adjusted by a set screw 42, as it becomes worn. As the cam 26 leaves the roller 25, the lever 23 is drawn back to its normal position, raising the die 20 by means of a spring 43, (see Fig. I,) and as the cams 30 and 35 leave the levers 31 and 36, the levers, with their dies, are drawn back by means of springs 44, the backward movement of the levers being checked by stop pins 45. By the time the cams have returned to their normal positions, the wire 11 is fed forward again, ready for another hook to be formed.

The machine is an inexpensive and durable one, is not likely to get out of order, and these hooks can be manufactured very rapidly.

I claim as my invention—

1. The combination of a rib 17 having a round upper end 18, and a semi-circular lower end 19, a vertically sliding die 20, having a lower end conforming in shape to the semi-circular lower end of the rib, and a side recess 35, a horizontally sliding die 28 having an end conforming in shape to the round upper end of the rib, a horizontally sliding die 34 having an end conforming in shape to the side recess of the vertically sliding die, means for feeding the wire, means for moving the dies, and means for cutting the wire; substantially as described.

2. The combination of the frame, the sliding head 4 having a bearing plate 6 and a pivoted dog, the serrated cam 15 and fixed projection 16, the rib 17 having a round upper end 18, and a semi-circular lower end 19, a vertically sliding die 20, having a side recess 35, a horizontally sliding upper die 28, a horizontally sliding lower die 34, means for moving the head, means for moving the dies, and means for cutting the wire; substantially as described.

3. The combination of a rib 17 having a round upper end 18, and a semi-circular lower end 19, a vertically sliding die 20 having a side recess 35, a horizontally sliding upper die 28, a horizontally sliding lower die 34, means for feeding the wire, bell crank levers and cams for moving the upper and lower dies, lever and cam for moving the vertical die, and means for cutting the wire; substantially as described.

FRANK STEINMANN.

In presence of—
A. M. EBERSOLE,
E. S. KNIGHT.